(12) United States Patent
Tokuyasu et al.

(10) Patent No.: US 7,552,633 B2
(45) Date of Patent: Jun. 30, 2009

(54) THERMAL TYPE GAS FLOWMETER

(75) Inventors: Noboru Tokuyasu, Hitachinaka (JP); Hiroaki Hoshika, Hitachiomiya (JP); Kaori Kashio, Hitachinaka (JP); Mituharu Osaka, Atsugi (JP); Toshiki Ohtsuki, Ayabe (JP); Yoshihiro Sukegawa, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/829,443

(22) Filed: Jul. 27, 2007

(65) Prior Publication Data

US 2008/0047340 A1 Feb. 28, 2008

(30) Foreign Application Priority Data

Jul. 28, 2006 (JP) .............................. 2006-205536

(51) Int. Cl.
*G01F 1/68* (2006.01)
(52) U.S. Cl. .................................. 73/204.22; 73/204.27
(58) Field of Classification Search .............. 73/204.15, 73/204.22, 204.23, 204.26
See application file for complete search history.

(56) References Cited

U.S. PATENT DOCUMENTS

| | | | | |
|---|---|---|---|---|
| 4,138,878 A | * | 2/1979 | Holmes et al. ................. 374/7 |
| 4,351,182 A | * | 9/1982 | Schmidberger ............ 73/23.31 |
| 4,587,842 A | | 5/1986 | Handtmann |
| 4,884,443 A | * | 12/1989 | Lee et al. .................. 73/204.16 |
| 5,003,822 A | * | 4/1991 | Joshi ........................ 73/204.23 |
| 5,311,772 A | | 5/1994 | Martinson et al. |
| 5,635,635 A | | 6/1997 | Tsukada et al. |
| 6,588,268 B1 | * | 7/2003 | Yamagishi et al. ........ 73/204.26 |
| 7,213,455 B2 | * | 5/2007 | Kobayashi et al. ........ 73/204.25 |
| 2007/0220968 A1 | * | 9/2007 | Tokuyasu et al. ......... 73/204.26 |
| 2007/0251315 A1 | * | 11/2007 | Sukegawa et al. ........ 73/204.27 |

FOREIGN PATENT DOCUMENTS

DE 40 12 081 A1 10/1991
JP 59-136620 A 8/1984

OTHER PUBLICATIONS

European Search Report dated Sep. 24, 2007 (four (4) pages).

* cited by examiner

*Primary Examiner*—Harshad Patel
(74) *Attorney, Agent, or Firm*—Crowell & Moring LLP

(57) ABSTRACT

A thermal type gas flowmeter comprising a sensor element which, in turn, comprises at least one first heating resistor, two or more resistors in fluid and a second heating resistor which is disposed between the first heating resistor and a housing supporting the sensor element. The first and second heating resistors are electrically independent from each other. A temperature sensing unit is provided between the first and second heating resistors. A temperature of the first or second heating resistor is controlled by a temperature sensed by the temperature sensing unit.

14 Claims, 20 Drawing Sheets

FEEDBACK CIRCUIT

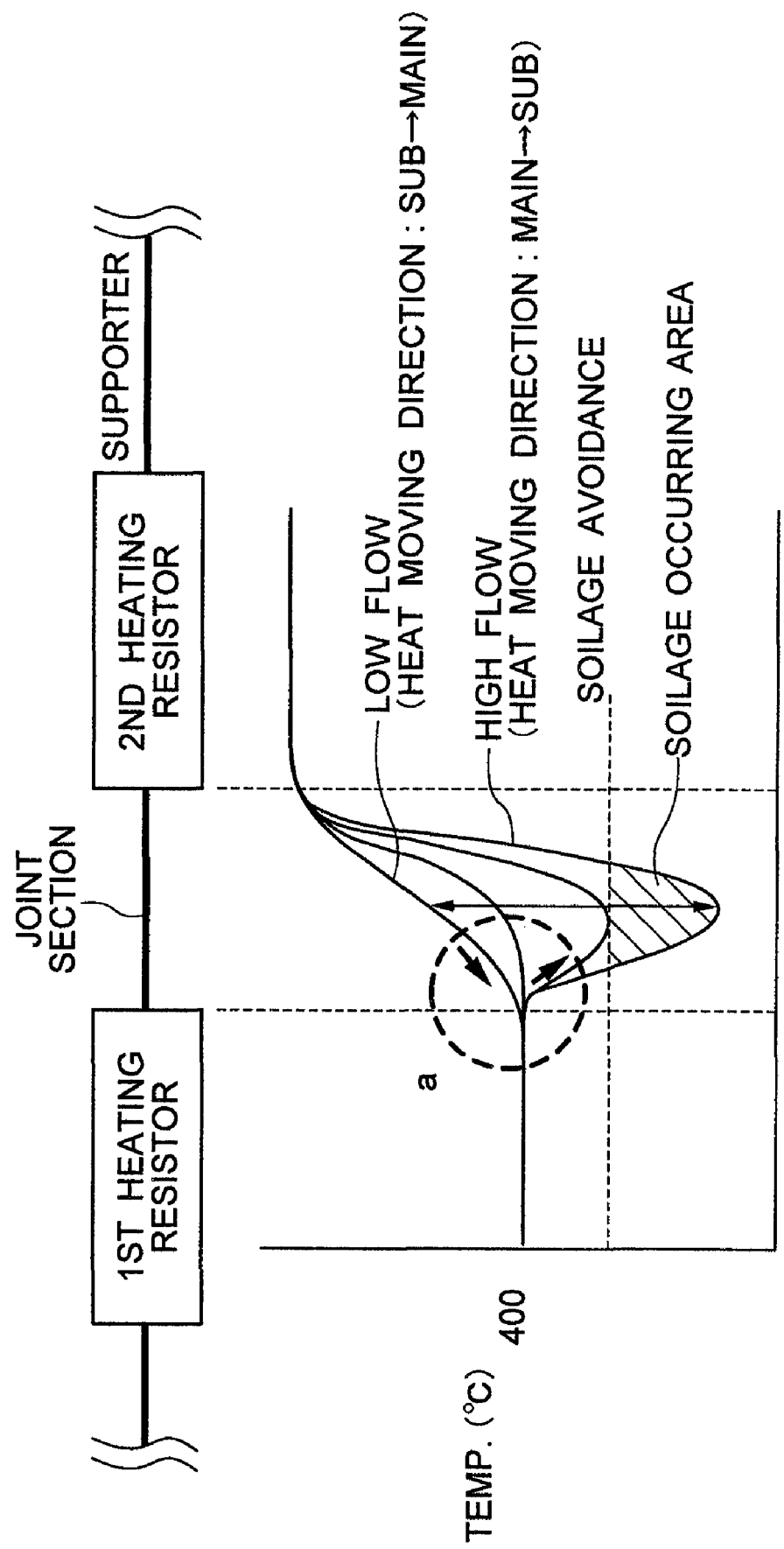

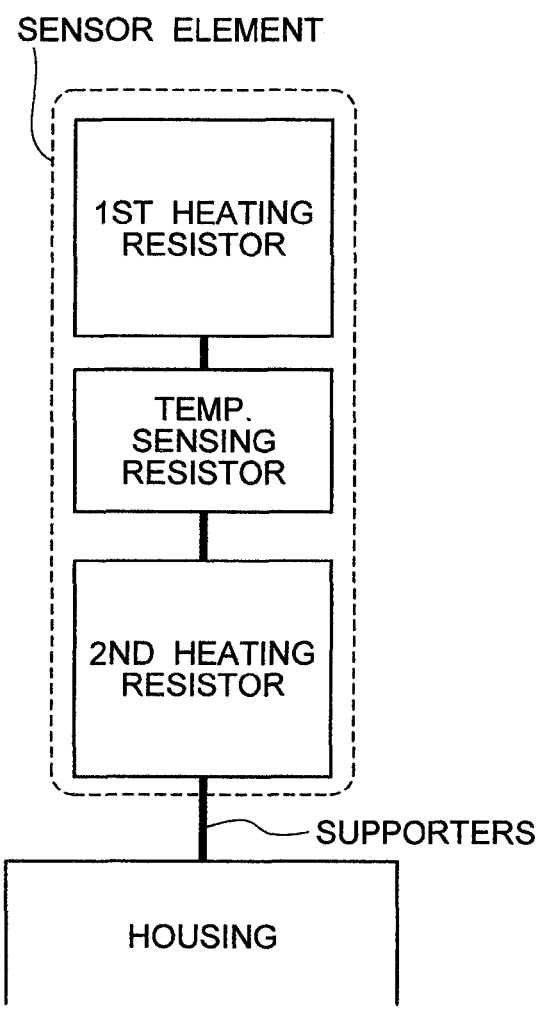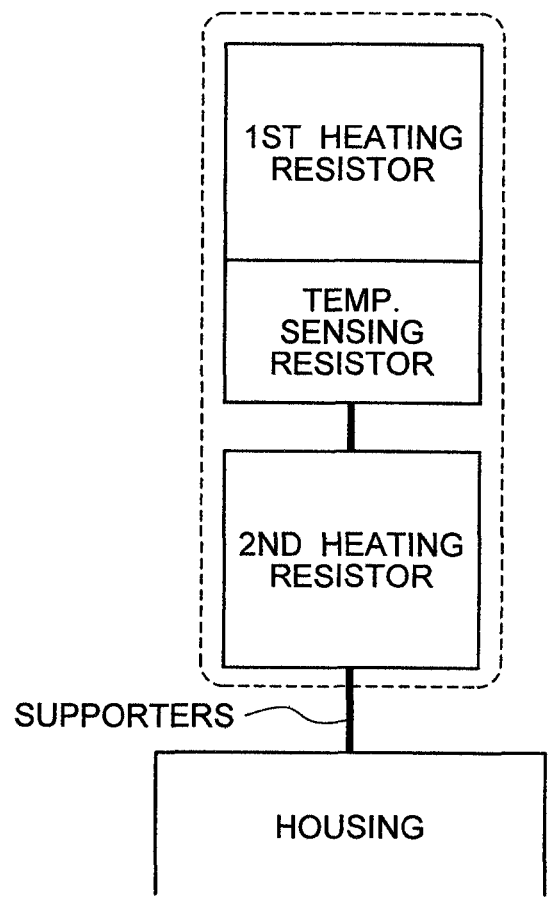

THERMAL TYPE GAS FLOWMETER

BACKGROUND OF THE INVENTION

1. Field of the Invention

The present invention relates to flowmeters which cause resistors to generate heat, thereby measuring the flow rate of a gas, and more particularly to a gas flowmeter which measures the flow of an exhaust gas flowing through an automobile engine system.

2. Description of the Related Art

As a prior art known example, JP-A-59-136620 discloses a means which includes at least two temperature-dependent resistors disposal in a fluid and at least two bridge circuits connecting the resistors. In use, the two resisters are heated to different temperatures to measure an amount of air necessary for the internal combustion engine. Especially, a flow-sensing resistor element is illustrated as having a structure in which a pair of protective heaters is each disposed at a respective one of both ends of a heat-sensing heating resistor. Both the resistor and the protective heaters are set to the same temperature in use. This prevents transmission of heat from the flow-sensing heating resistors to the substrate. Thus, the responsiveness of the measuring resistors is increased in spite of their masses being large.

SUMMARY OF THE INVENTION

The above prior-art flowmeter is considered as optimal to solving the prior art problems and achieving the objects thereof. In contrast, the present invention proposes means optimal for conquering possible problems that will occur when the present invention aims to apply not only to the intake environment of the prior art internal combustion engines but also to a severer exhaust environment.

When the gas flowmeter is used especially in an exhaust atmosphere, involatile components of the exhaust which contains mainly soot are deposited on supporters which support the heating resistors of the flowmeter. The supporters are, more than a little, at a higher temperature than the fluid due to heat from the heating resistors. Thus, when heat transmission from the supporters to the fluid changes between before and after the soot deposits, the output of the flowmeter would be affected adversely. In order to prevent this undesirable situation, a sensor element of the flowmeter has a structure similar to the prior art structure in which the pair of protective heaters each are disposed at a respective one of both the ends of the flow-sensing heating resistor for preventing heat transmission because the situation occurs due to transmission of heat from the heating resistor to the supporters although the present structure is different in object from the prior-art structure. However, the essence of the problem does not lie there. Deposit of soot will seemingly increase the whole physical volume and surface area of the supporters. In order to prevent adverse influence due to the deposit of soot, the protective heaters are preferably set at all times to a higher temperature than the flow-rate sensing heating resistor. The reason why heat transmitted from the protective heaters absorbs all changes in the heat transmission due to the deposit of soot. In other words, when the flow-sensing heating resistor is the same or higher in temperature as or than the protective resistors, a part of heat transmitted necessarily to the fluid due to the deposit of soot is compensated by heat transmitted from the protective heaters. This heat transmission will produce an output error. Note that the structure of the flowmeter in which the protective heaters are used irrespective of the set temperature takes the advantage of reducing adverse influence by soilage to some extent. Since in the prior art the flow sensing heating resistor and the protective resistors are controlled so as to be at the same temperature at all times, occurrence of an output error of the flowmeter cannot be prevented.

In order to maintain this ideal temperature relationship, however, new structural restrictions occur. For example, JP-A-59-136620 discloses a sensor element in FIG. 5 in which a flow-sensing heating resistor is disposed between two protective heaters disposed on a dielectric board. In this sensor element, it is difficult to maintain the relationship "the flow-sensing heating resistor is lower in temperature than the two protective heaters". It is necessary to restrict the thermal capacity of the sensor element to a minimum value from a standpoint of restriction on a power supply voltage available to drive the sensor module. To this end, the sensing heating resistor is required to be disposed close to between both the protective resistors. In this case, the flow-sensing heating resistor, set to a lower temperature, is automatically heated by heat from the protective heaters which are set to a higher temperature. When the flow of a fluid is small, a situation occurs in which no current flows through the flow-sensing heating resistor. Thus, in an area where the flow of the fluid is small, it is impossible to measure the flow. In the first place, when a plurality of resistors is disposed in a single sensor element, the structure would necessarily become complicated and the production would be difficult.

It is an object of the present invention to provide a thermal gas flowmeter having a sensor structure capable of maintaining an initial sensing accuracy for a long time even in a dirty, severe thermal exhaust environment, and a method of controlling the flowmeter.

In order to solve the above the object, according to the present invention, there is provided a thermal type gas flowmeter comprising a sensor element supported by a housing, the sensor element comprising at least one first heating resistor for sensing flow volume of fluid, two or more resistors located in the fluid, and a second heating resistor located between the first heating resistor and the housing for preventing transmission of heat from the first heating resistor to the housing, wherein a temperature sensing means is located between the first and second heating resistors.

As a specified embodiment, the temperature of the first or second heating resistor is controlled based on the temperature sensed by the temperature sensing means provided between the first and second heating resistors.

Preferably, a target fixed or variable value is set for the heating temperature of the first or second heating resistor and the temperature of the first or second heating resistor is controlled so as to be the target value.

Preferably, the temperature of the second resistor is controlled so as to be higher than that of the first heating resistor.

Preferably, a lower one of the temperatures of the first and second heating resistors is controlled so as to be equal to or over 350° C. in the measurement or a non-measurement period.

Preferably, an overheat prevent means is provided for preventing overheat of both or one of the first and second heating resistors, wherein the real temperature of any one of the first and second heating resistors is controlled so as to be a target upper limit temperature or less during a time when the real measured temperature value, or a calculated inferred temperature, of any one of the first and second heating resistors reaches the predetermined target upper limit temperature and then decreases from the target upper limit temperature after reaching the target upper limit temperature.

As a sensor structure preferred for implementing the present invention, the sensor element comprises a first heating resistor, a temperature-sensing resistor and a second heating resistor and a conductive member that supports each of the resistors, the conductive member extending in one direction from the heating portion or being disposed collectively. It is desirable to structure in a manner that a conductive wire is wound on a cylindrical insulating member a plurality of times, and an insulating layer for protecting the conductor is formed on the surface of the conductor, or in a manner that a plurality of resistors are formed between the insulating layers laminated.

Preferably, each of the first heating resistor, the temperature in the present invention, failure judgment means is provided to determine whether the first or second heating resistor is out of order and, if so, for issuing a warning. Further, preferably, means is provided for sensing an accidental fire in an internal combustion engine, and, when the accidental fire occurs, for cutting off power supply to the heating resistors or for changing a target set temperature to lower one for explosion protection.

According to the present invention, the gas flowmeter for use in an exhaust environment of severe soilage and heat is capable of maintaining the initial sensing accuracy for a long time.

Other objects, features and advantages of the invention will become apparent from the following description of the embodiments of the invention taken in conjunction with the accompanying drawings.

BRIEF DESCRIPTION OF THE DRAWINGS

FIG. 10 illustrates a problem with the sensor element having a second heating resistor.

FIGS. 20A and 20B schematically illustrate the structure of a sensor element to achieve the embodiment.

DETAILED DESCRIPTION OF THE EMBODIMENT

Figure 1:
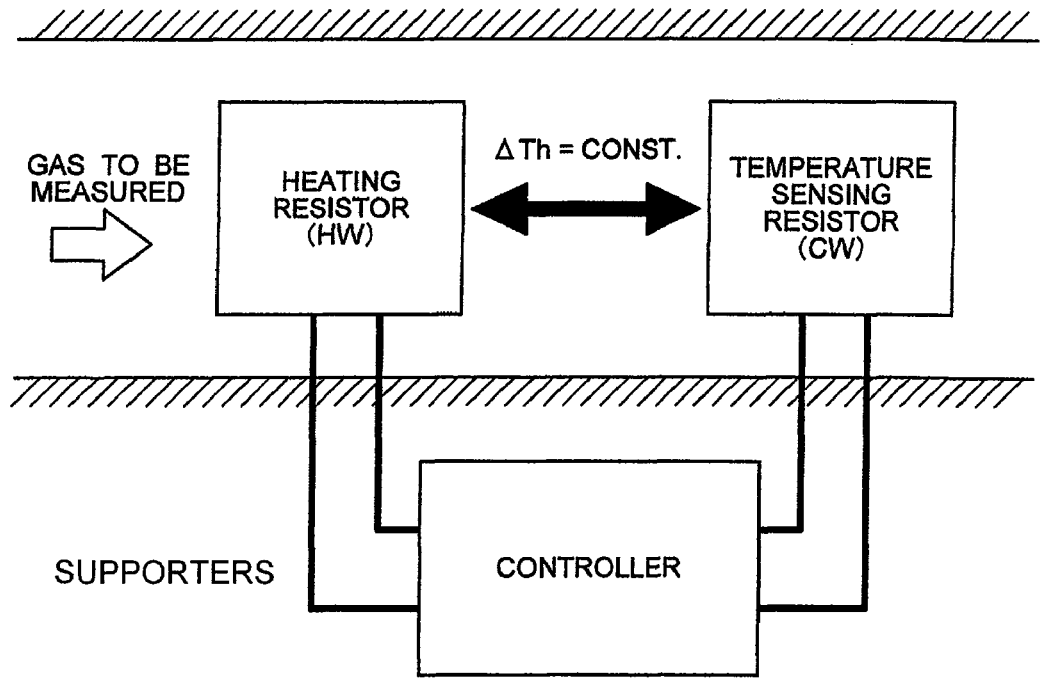
FIG. 1 schematically illustrates the structure of an intake flowmeter.
Figure 2:
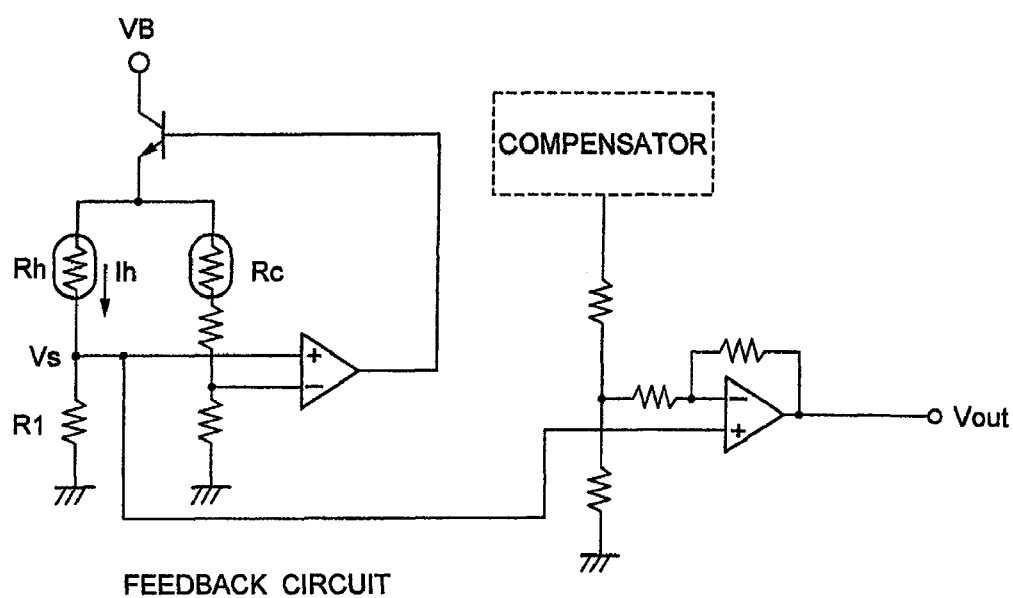
FIG. 2 illustrates the structure of a bridge control circuit of the intake flowmeter.

Referring to FIGS. 1 and 2, the principle of a conventional thermal type gas flowmeter which is the mainstream of intake flowmeters will be outlined. FIG. 1 shows the structure of the thermal type gap flowmeter in which at least two resistors are disposed in a fluid; one is used as a temperature sensing resistor for sensing a temperature of fluid and another as a heating resistor for sensing a flow volume, respectively, such that a difference in temperature ($\Delta Th$) between those resistors is maintained constant at all times by a controller to measure a mass flow of the fluid. The temperature difference $\Delta Th$ is generally set to approximately 200° C. by comprehensively judging the measurement accuracy, responsiveness, prevention of dust soilage, and durability and heat resistance of the materials of the flowmeter.

FIG. 2 shows the structure of a bridge control circuit which includes a heating resistor and a temperature-sensing resistor. Let Rh and Ih be the resistance of the heating resistor and a current flowing through the heating resistor, respectively. Then, the relationship between the whole quantity of heat Ph produced by the heating resistor, the flow Q of the fluid flowing through the heating resistor, and the temperature difference $\Delta Th$ is represented by equation (1):

$$Ph = Ih^2 Rh = (A + B\sqrt{Q})\Delta Th \qquad (1)$$

Where A is an amount of heat (or heat leakage) transmitted from the heating resistor to supporters, and B is an amount of heat taken away by the fluid and represented as a thermal constant. A voltage Vs at a midpoint between the heating resistor Rh and a fixed resistor R1 is represented by expression (2) below based on expression (1). It will be understood that the voltage Vs depends on the mass flow of the fluid. An output Vout from the sensor includes an analog voltage obtained by amplifying the voltage Vs.

$$V_S = R1 \cdot 1h = R1\sqrt{\frac{1}{Rh}(A + B\sqrt{Q})\Delta Th} \qquad (2)$$

Soilage is an important problem with a device which is used in an exhaust environment. Although depending on the object of use and principle of operation of the device, soilage of the sensor element of the thermal type flowmeter would exert a fatal influence on maintenance of its measurement accuracy.

In the exhaust environment of the internal combustion engine, involatile components included in fine grain substances (PM) such as dry soot and ash discharged from the engine brings about soilage. The dry soot is produced due to an insufficient mixing in amount of air taken and fuel injected into the combustion chamber of the engine, or due to insufficient oxidation. The soilage is produced due to adhesive forces of volatile components such as SOF (Soluble Organic Components) and HC (Hydrocarbon) included in the PM. Since the content of the volatile components is determined by combustion of the internal combustion engine, the production of the soilage is determined depending on the temperature of an object.

Figure 3:
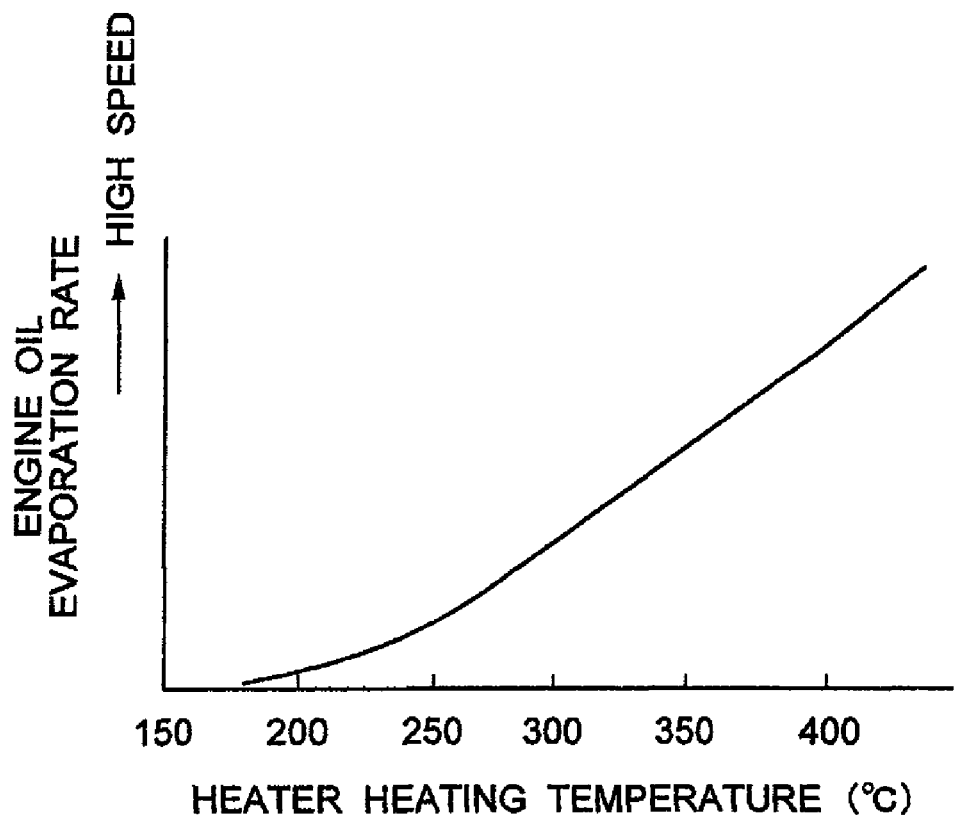
FIG. 3 illustrates a relationship between the temperature of a heating resistor and an evaporation rate of an engine oil.

FIG. 3 shows a relationship between the heating temperature of the heating resistor and an evaporation rate of engine oil. As the heating temperature increases, the evaporation rate increases. It is known experimentally that soilage of the flow-sensing heating resistor can be avoided depending on the heating temperature and more particularly by setting the temperature of the heating resistor to approximately 350° C. or more. It is considered from experiments, verification and basic study that soilage occurs due to the following phenomenon.

Figure 4A:
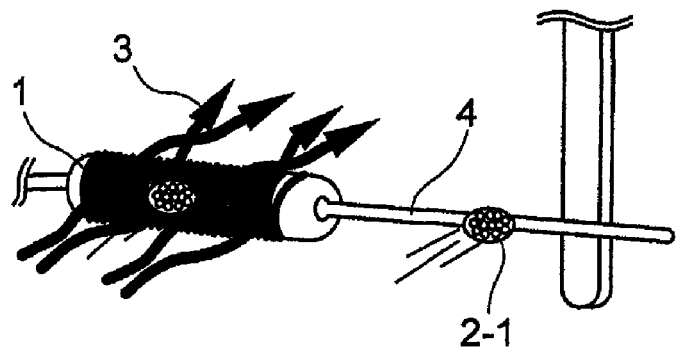
FIGS. 4A-4C illustrate a cause of soilage occurrence when the heating resistor is heated.
Figure 4B:
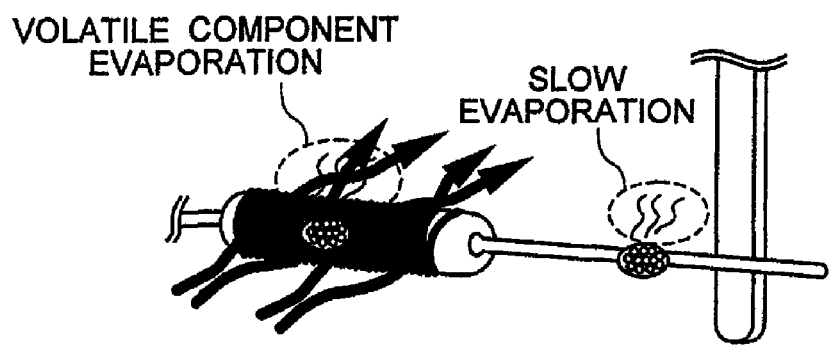
Figure 4C:
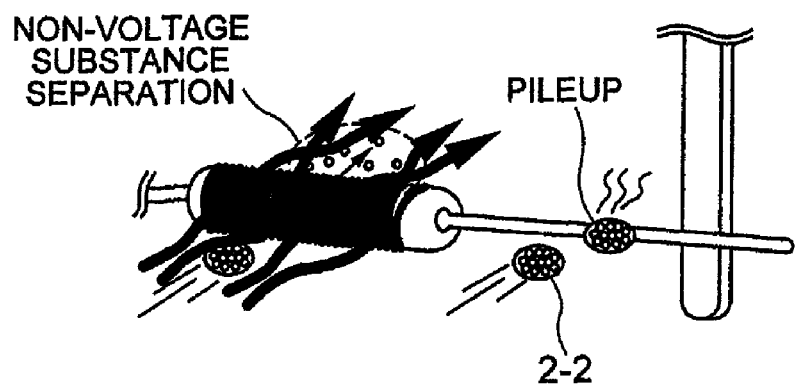

As shown in FIGS. 4A-4C, when exhaust fine-grain substances PMs 2-1 hit the heating resistor 1, heated to a high temperature, the volatile components included in the substances are instantaneously evaporated by heat from the heating resistor and the adhesive forces of the PMs 2-1 decrease. The involatile components that include soot mainly as soiled substances are separated from the surface of the heating resistor due to a decrease in the adhesive force thereof and a gas 3 flowing along the resistor 1 until next PMs hit. With the supporters 4 which are lower in temperature, the volatile components deposited on the supporters 4 are evaporated slowly from the supporters 4 or takes a considerably long time until their adhesive force is reduced to a predetermined level, which brings about separation of the volatile components. Thus, it is considered that the soot deposit on the heating resistor 1 advances because new PMs 2-2 hit and deposit on the PMs 2-1 which first hit the supporters 4.

Figure 5:
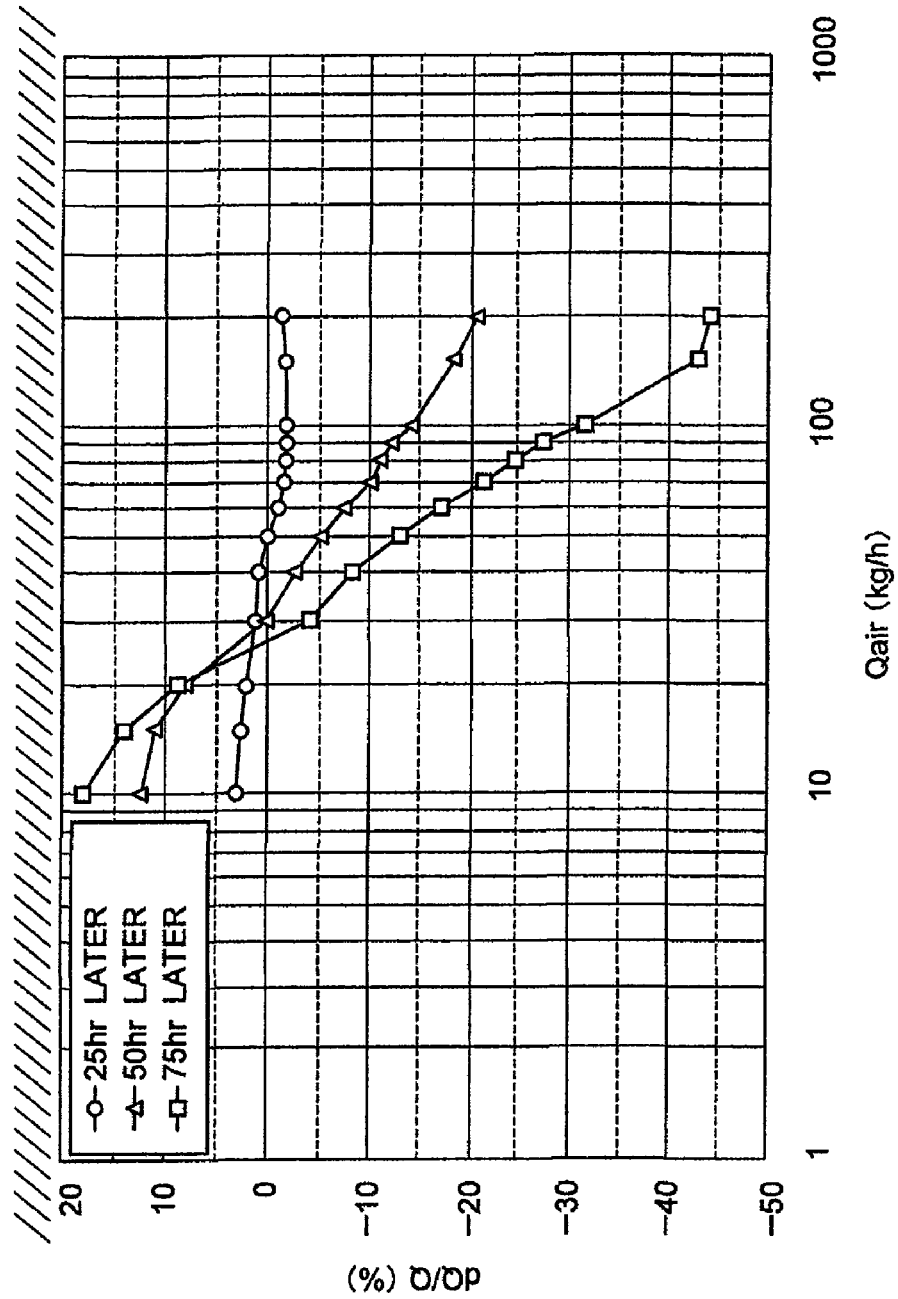
FIG. 5 illustrates a result of real measurement obtained by using a sensor element for an intake flowmeter.

When a conventional (intake) sensor element without the protective heaters is used, the sensor output relative to the gas flow with time changes greatly as a time elapses. FIG. 5 illustrates a result of a real measurement. It shows errors when the idling is maintained. It will be seen that there is a tendency that in a lower flow area, a negative error is produced while in a higher flow area, a plus error is produced. Especially, it will be known that 75 hours after the test started, a large error of approximately 50% was produced in the vicinity of a maximum flow in the test range. An idea for conquering this problem will be described next.

Figure 6:
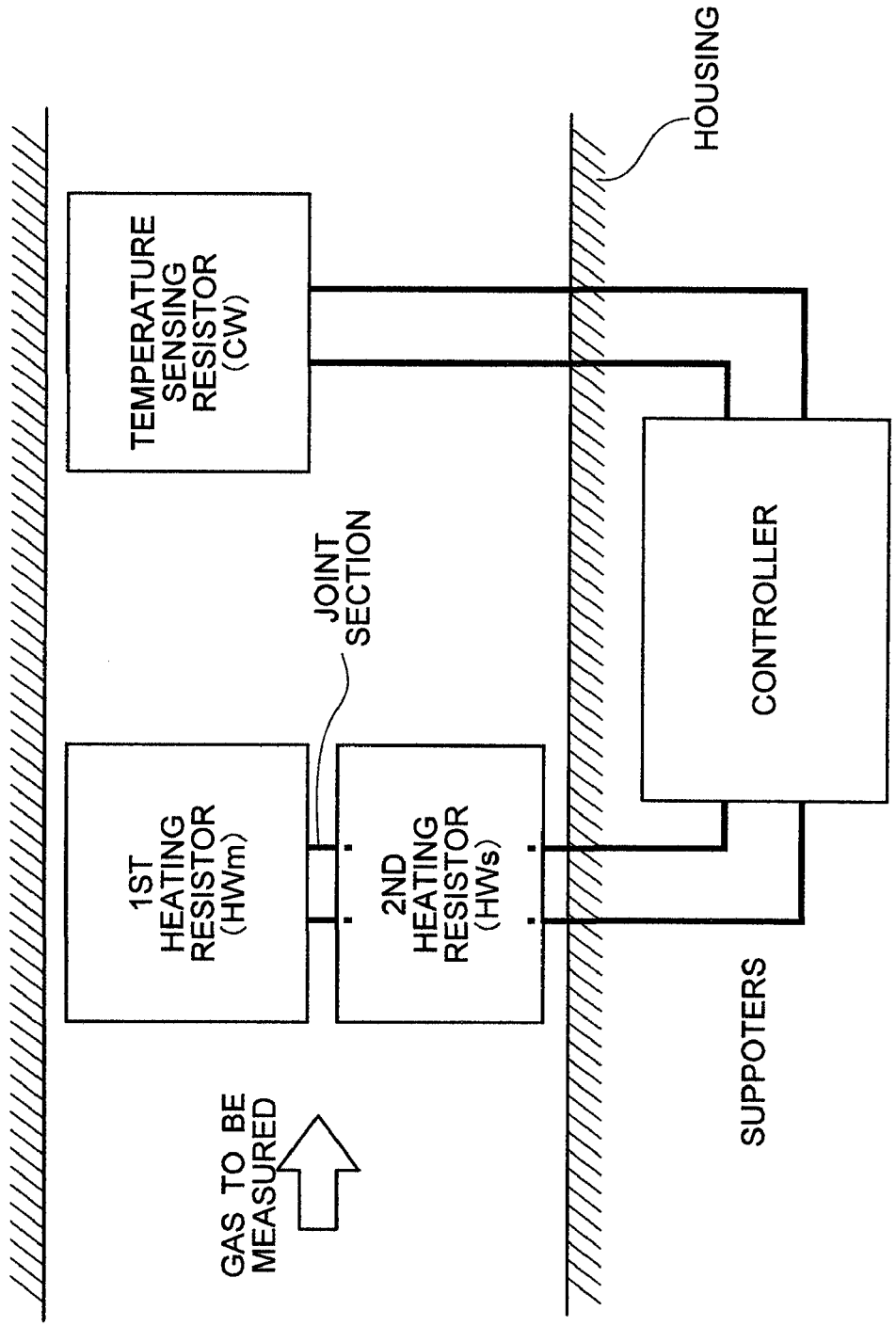
FIG. 6 schematically illustrates a thermal type flowmeter having a second heating resistor.

FIG. 6 illustrates the basic construction of a thermal type gas flowmeter according to the present invention to conquer the problem. When FIG. 6 is compared to FIG. 1, it will be quite obvious that a second heating resistor (or protective heater) is disposed between a heating resistor for flow-sensing (a first heating resistor of FIG. 6) which is the same as the flow-sensing heating resistor of FIG. 1 and a supporter connected to the housing. The features of this basic structure are that the second heating resistor intervening between the first heating resistor and the supporter intercepts transmission of heat from the first heating resistor to the supporter. The structure of the sensor element illustrated in the present invention is only exemplary and does not imply being restrictive and any sensor structure may be used as long as the heat transmission is prevented although the specified structure of the sensor will be described below.

The reason why the arrangement of the second heating resistor produces advantages will be described. In the expression (1) which indicates the relationship between the whole heat Ph produced by the heating resistor, the mass flow Q of the fluid flowing to the heating resistor, and the temperature difference $\Delta Th$, an error occurs when the thermal constant A changes between before and after the soilage occurrence, which implies heat transmitted or leaking from the heating resistor to the supporter. By disposing the second heating resistor, a produced amount of heat required by the first heating resistor can be separated from the amount of heat to be transmitted to the supporter. That is, the gas flow can be senses irrespective of soilage of the supporter by providing a structure in which the amount of heat to be transmitted between the first and second heating resistors can be controlled at will.

Figure 7:
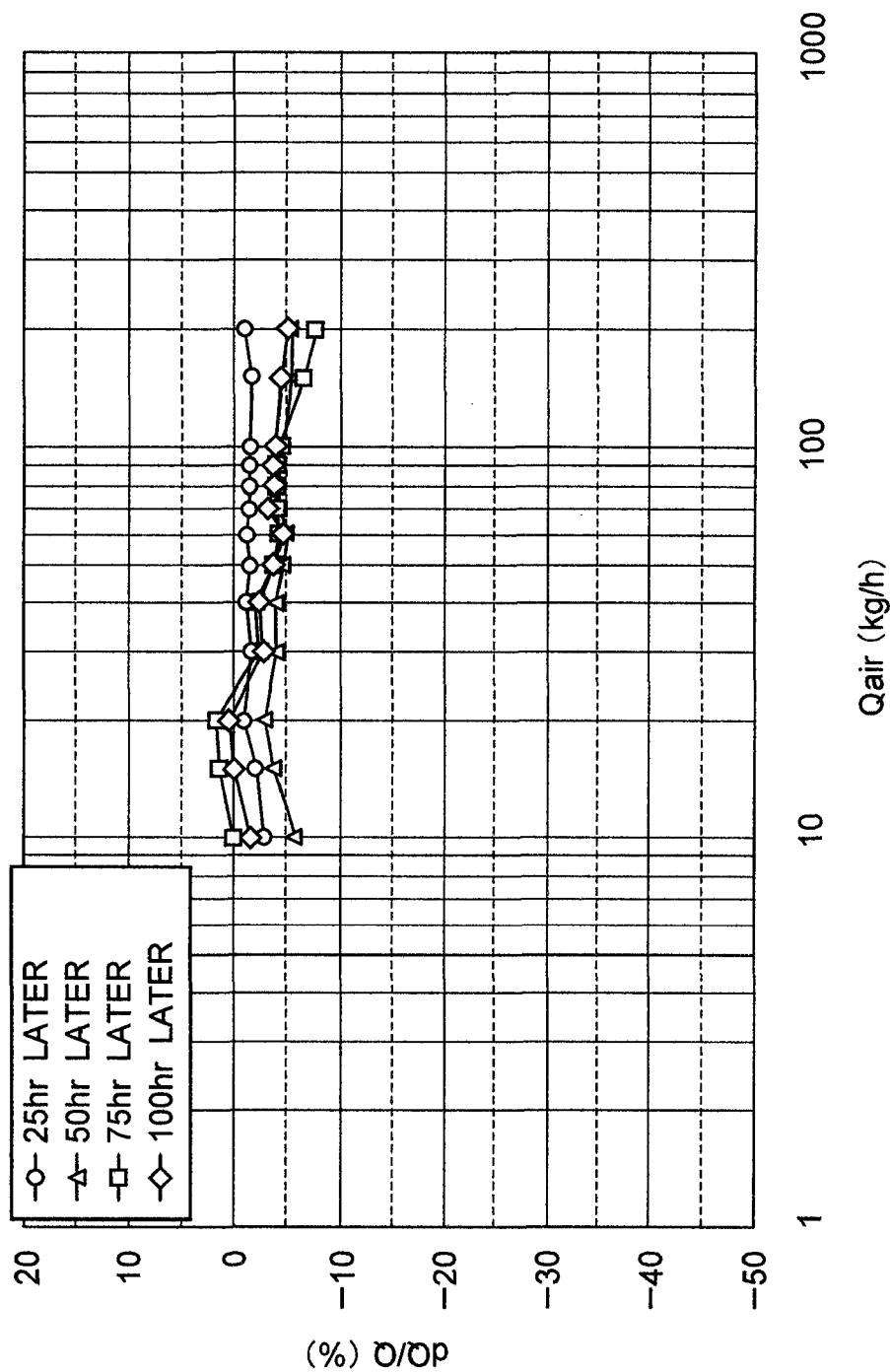
FIG. 7 illustrates a result of real measurement obtained by using a sensor element having a second heating resistor.

FIG. 7 illustrates results of experiments performed by using a sensor element in which the second heating resistor was arranged. It will be seen that an error between the initial and output characteristics of the sensor 100 hr after the start of the test was suppressed to within approximately 5%. As will be obvious in comparison to FIG. 5, a great improvement is achieved compared to the result obtained by the use of the conventional sensor.

Figure 8A:
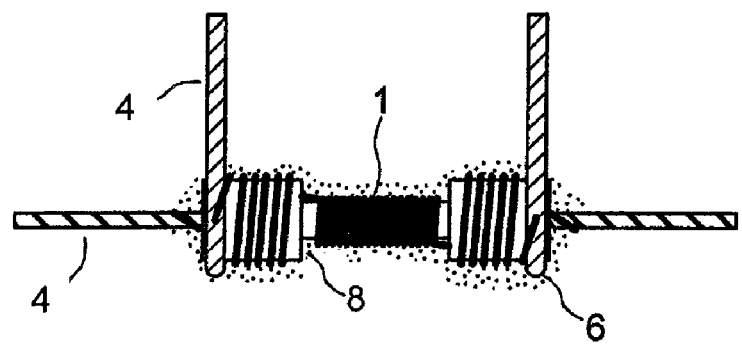
FIGS. 8A and 8B illustrate the structure of a sensor element having a second heating resistor, based on an intake coil type sensor element.
Figure 8B:
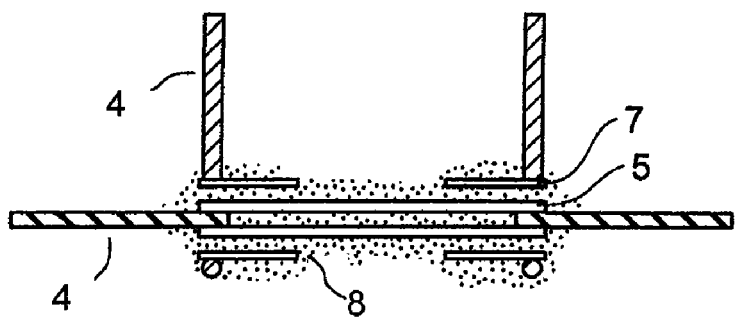
Figure 9A:
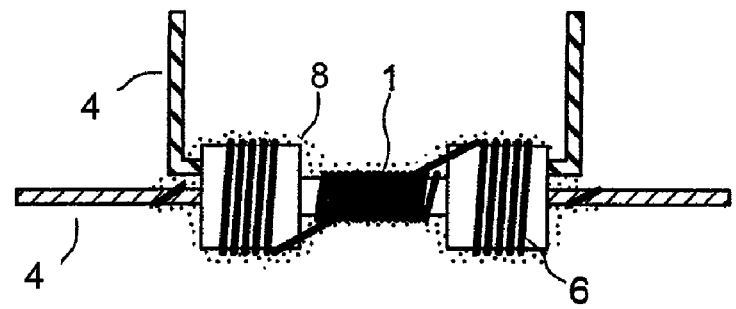
FIGS. 9A and 9B illustrate the structure of another sensor element having a second heating resistor, based on the intake coil type sensor element.
Figure 9B:
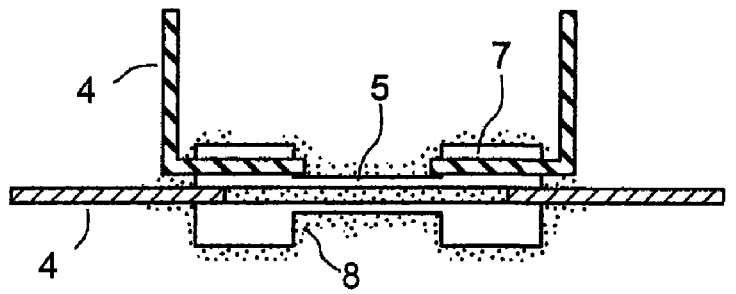

Referring to FIGS. 8A, 8B and 9A and 9B, the structures of sensor elements will be described in which a second heating resistor is disposed on the base structure of the sensor element of the current intake flowmeter. A alumina pipe 5 is used as an insulator forming a heating resistor of the sensor element. The alumina pipe 5 and its supporter 4 is jointed with high heat-resistant glass. A Pt-wire (winding) 1 which composes the first heating resistor for flow sensing is wound around a mid-portion of an alumina pipe 5 in a spiral manner. In addition, alumina pipes 7 are disposed at both ends of the alumina pipe 5. Like the first heating resistor, a Pt wire composing the heating resistor 6 is wound around each of the alumina pipes 7 and then coated with an insulating protective film (of glass) 8 so as to totally enclose the whole of the sensor element. FIGS. 8A and 8B show the sensor element with the separate alumina pipes 5 and 7. FIGS. 9A and 9B show the sensor element with integral alumina pipes 5 and 7.

The problem with those sensors will be described with reference to FIG. 10, which shows changes in the distribution of temperature through the sensor element occurring in a fluid when the sensor element is supplied with an electric current such that the first and second heating resistors are maintained at high different temperatures. Assume that the first and second heating resistors were set to 400° C. and a temperature higher than 400° C., respectively. It is preferable that the first heating resistor is lower in temperature than the second heating resistor because, as described before, changes in the heat to be transmitted to the fluid due to the deposit of soot can all be compensated with heat from the second heating resistor, thereby suppressing adverse influence on measurement of the fluid due to soilage. The temperature of the joint section between the first and second heating resistors changes depending on the flow (or flowing speed) of the fluid flowing to the sensor element. Especially, if the respective heating resistors are adjusted so as to maintain their target temperatures when the flow is at stop or small, a temperature in the joint section in a higher-flow area would be lowered. If a situation continues in which the temperature of the joint section is lower than a soilage avoidance temperature of approximately 350° C., there is a possibility that soilage will occur at the join section. It is inferred from the principle of the sensor operation that when soilage occurs at the joint section, the arrangement of the second heating resistor becomes meaningless. Thus, measures for avoiding a remarkable decrease in the temperature of the joint section are required. Transmission/reception of heat at an end portion of the first heating resistor corresponding to an area "a" encircled by a dotted line in FIG. 10 changes depending on the flow. An ideal state is when a temperature gradient is zero at the end of the first heating resistor. In this state, no heat flows from the first heating resistor to the second heating resistor and no heat flows to the joint section in a reverse direction. Thus, it is ensured that the outstanding problem due to the heat transmission is solved.

Figure 11:
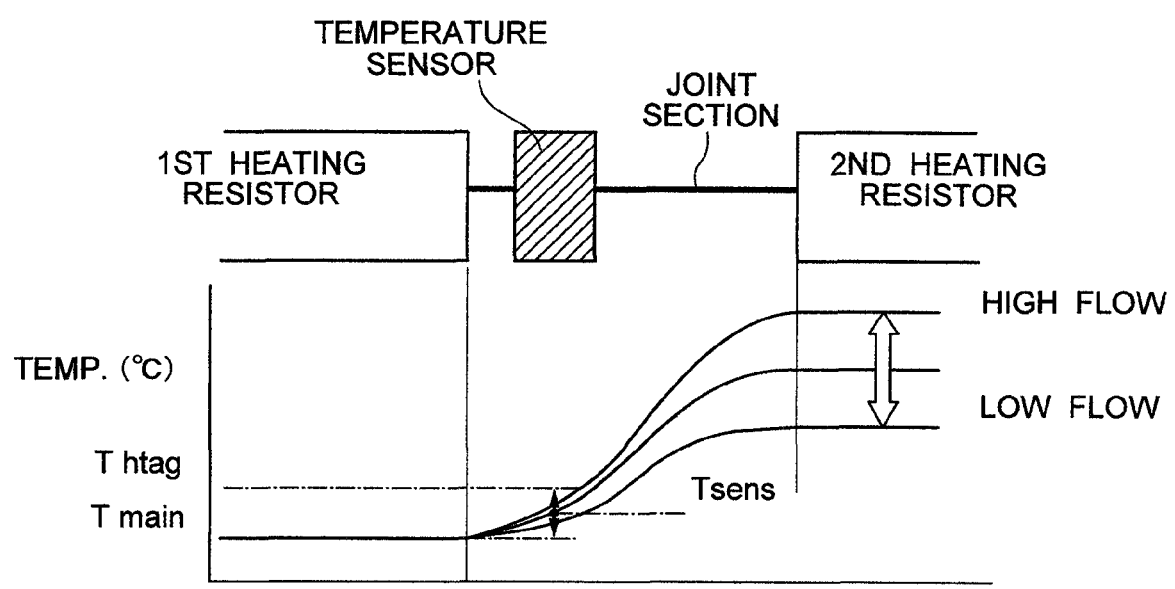
FIG. 11 illustrates the structure of an embodiment of the present invention.
Figure 12:
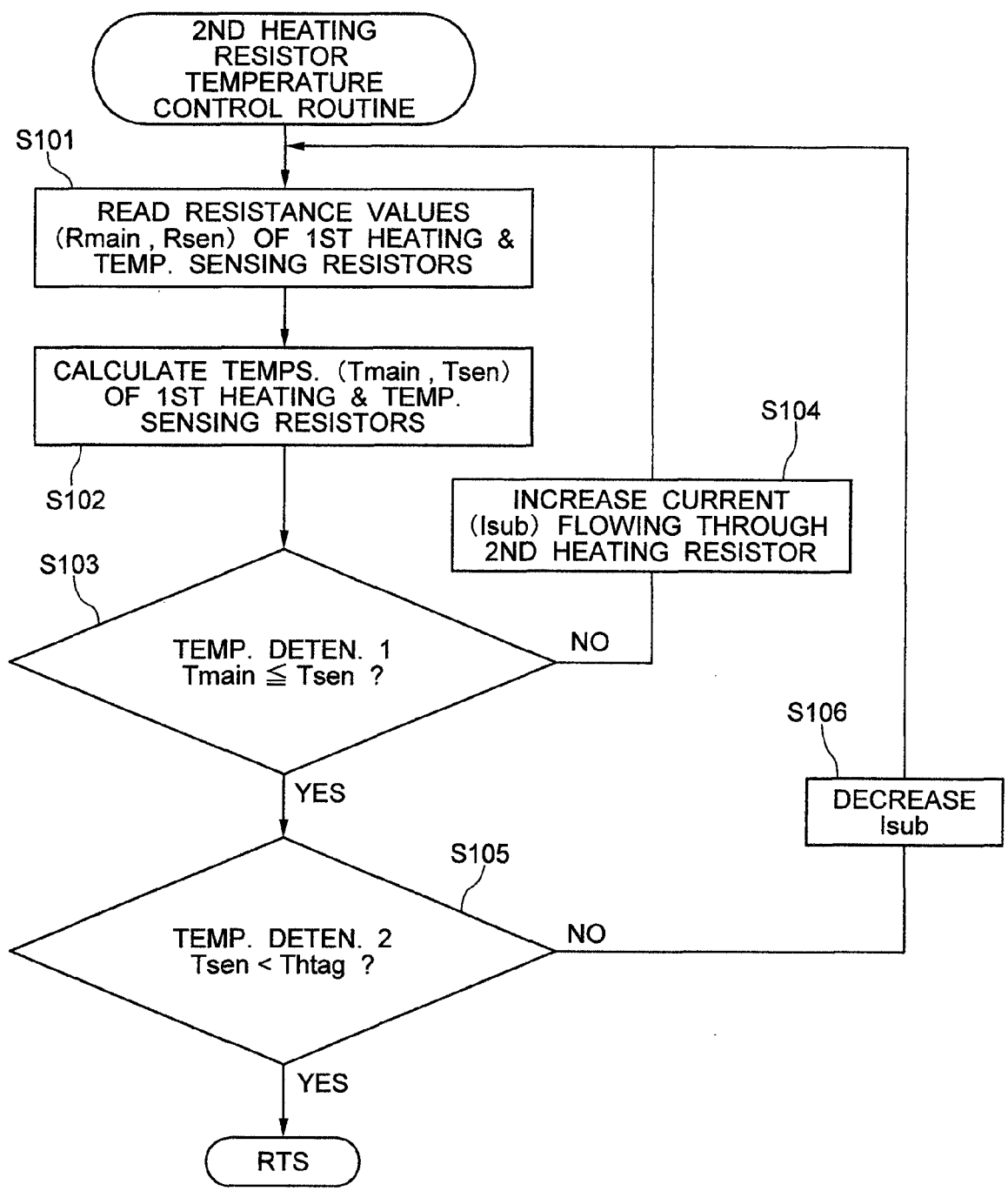
FIG. 12 illustrates a control flow in the embodiment.

An embodiment of the present invention shown in FIG. 11 will be described. In the basic structure of the embodiment, a temperature sensing means is disposed close to the first heating resistor. Simply stated, like the heating resistor, a Pt coil can be used as the temperature sensing means, but any means that can sense temperature may be used. The set temperature is assumed that the first heating resistor<the second heating resistor, and the heating temperature of the second heating resistor is controlled depending on the temperature sensed by the temperature sensing means. FIG. 12 illustrates a specified control flow for that purpose. First, resistance values Rmain and Rsen of the first heating resistor and the temperature sensing means (hereinafter referred to as temperature sensing resistor) are read (S101) and then the corresponding temperatures Tmin and Tsen are calculated (S102). Then, it is determined in S103 whether Tmain≦Tsen. If not, in S104 a current Isub flowing through the second resistor is increased and then control returns to S101. This raises the temperature of the second resistor, which also increases Tsen. This is repeated. If the determination is affirmative in S103, control passes to S105 where it is determined whether Tsen<Thtag which is a target upper-limit temperature of Tsen. If not, control passes to S106 where Isab and hence Tsen are decreased. Then, control returns to S101. When the determination is affirmative in S105, the control looping operation ends. By repeating this looping operation in a short time, the relationship Tmain≦Tsen<Thtag is maintained at all times, thereby controlling the temperature gradient of the first resistor to within a predetermined range.

Figure 13:
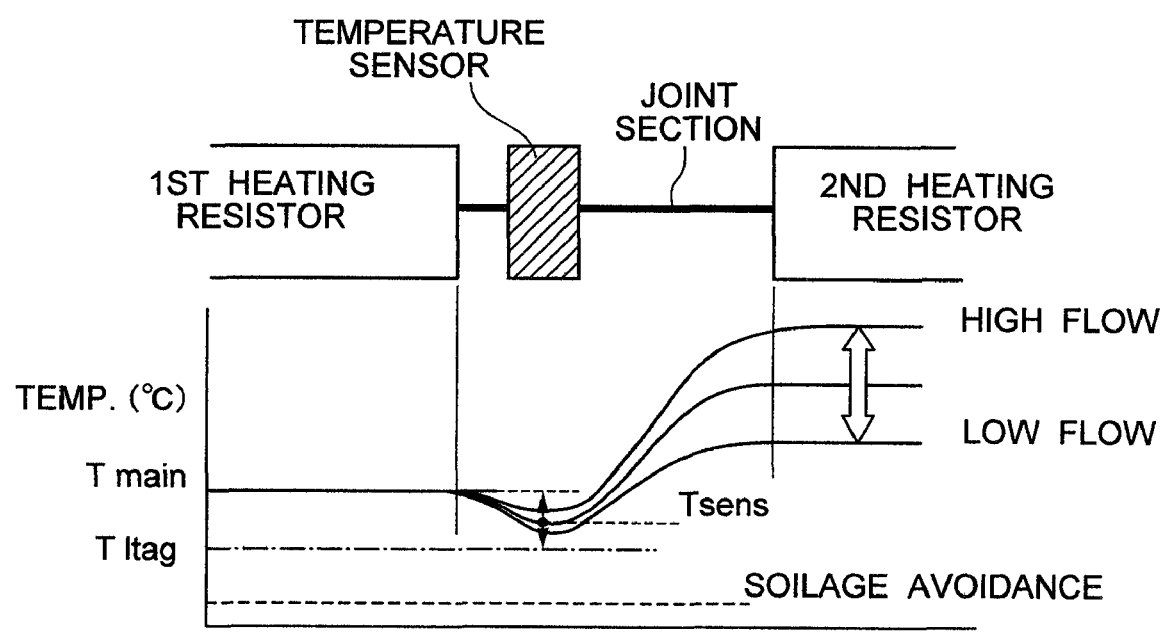
FIG. 13 illustrates the structure of a second embodiment of the present invention.
Figure 14:
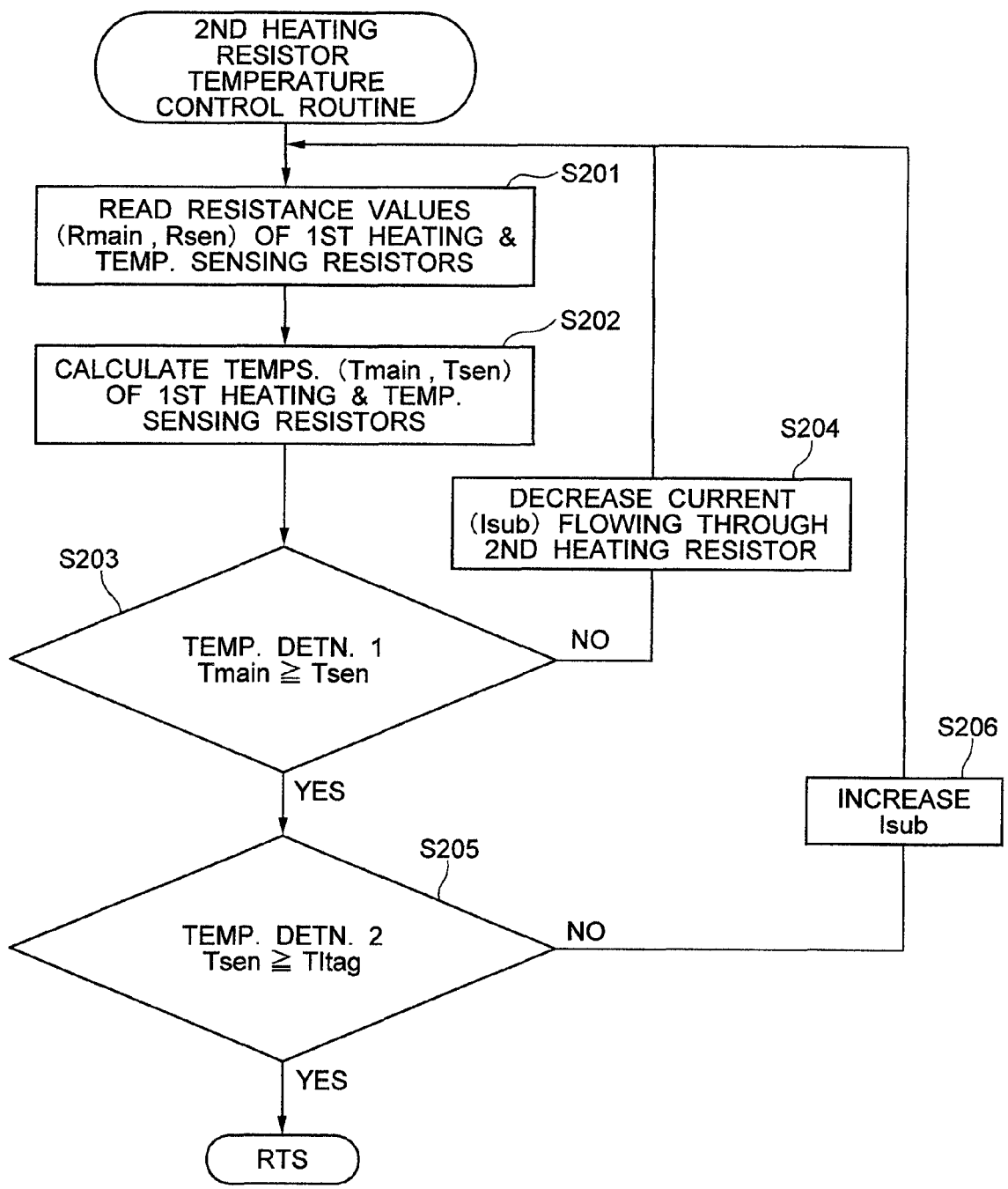
FIG. 14 illustrates a second control flow in the embodiment.

In addition to the temperature control method based on the relationship "the set temperature of the first resistor<that of the second resistor", a method of maintaining the relationship "Tltag<Tsin≦Tmain" can be performed as shown in FIG. 13 where Tltag is a target lower-limit temperature of Tsen. A control flow in this case will be described with reference to FIG. 14 in comparison to FIG. 13. Like S101 and S102 of FIG. 12 also in this control system, first, the resistance values Rman and Rsen of the first heating and temperature resistors are read in S201 and then the corresponding temperatures Tmain and Tsen are calculated in S202. Then, it is determined in S203 whether Tmain≧Tsen. If not, control passes to S204 where a current Isub flowing through the second resistor is decreased and then control returns to S201. This decreases the temperature of the second resistor, which decreases Tsen. If the determination is affirmative in S203, control passes to S205 where it is determined whether Tsen>Tltag which is a target lower-limit temperature of Tsen. If not, control passes to S206 where Isub and hence Tsen are increased. Control then returns to S201. When the determination is affirmative in S205, the looping operation ends. Besides, a method of maintaining a relationship "Tltag<Tsen<Thtag" can be performed where Tltag and Thtag represent target upper and lower temperatures, respectively. In all these cases, Thtag and Tltag are required to be set to such temperature levels that the end portion of the first heating resistor is in an acceptable range of temperature gradients.

The method of controlling the temperature of the end of the first heating resistor by increasing and decreasing the temperature of the second heating resistor described with reference to FIGS. 11-14 may break the second heating resistor when the temperature of this resistor rises excessively.

Figure 15:
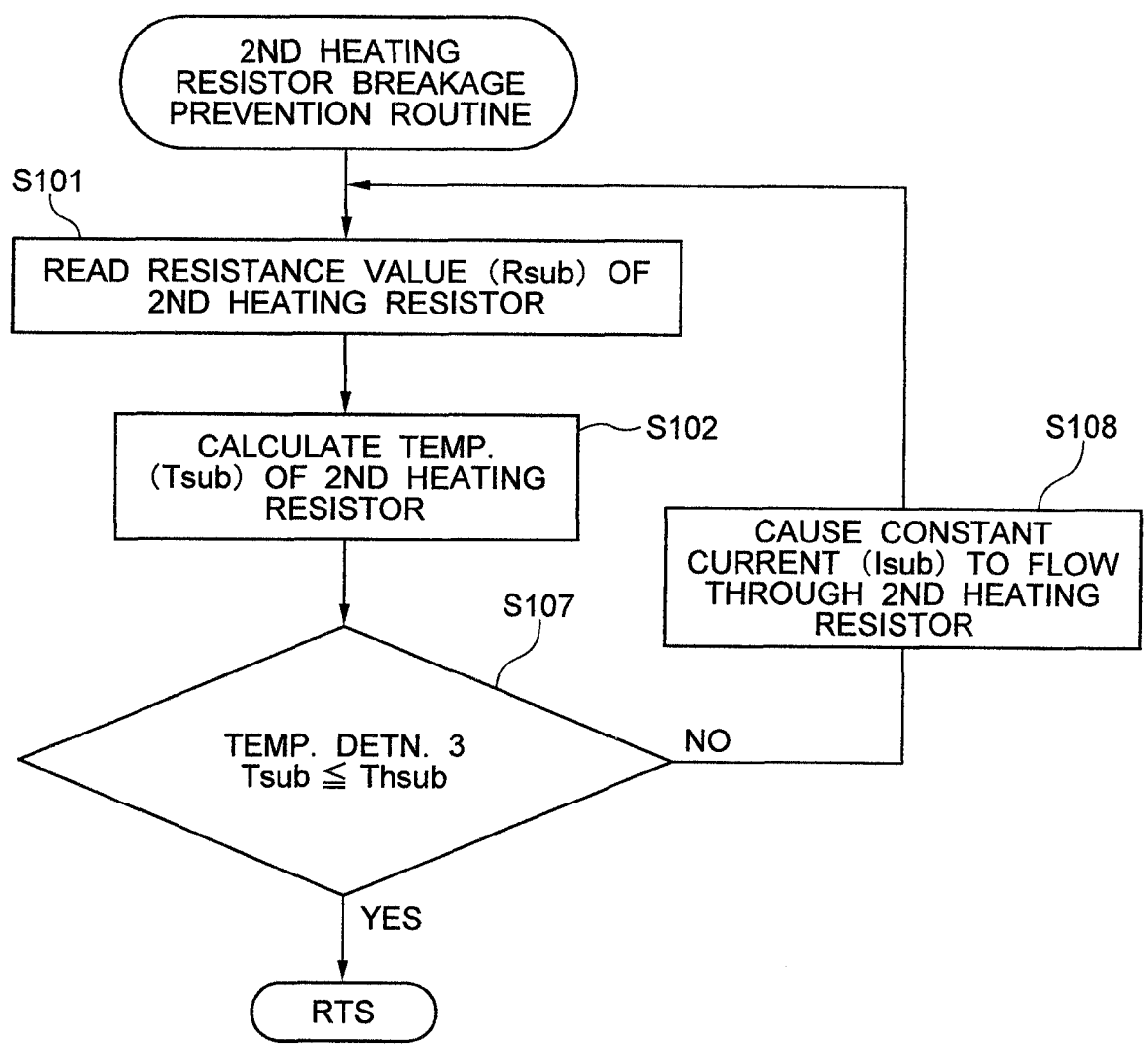
FIG. 15 illustrates a control flow to prevent breakage of the second heating resistor.

In order to avoid this undesirable situation, it is effective to set an upper limit to the temperature of the second resistor. For example, in the control flow of FIG. 15, the resistance value and temperature of the second resistor are read and calculated, respectively, in S101 and S102. Furthermore, in S107 the temperature Tsub of the second resistor is compared to the target upper limit temperature Thsub of the second resistor. If Tsub>Thsub, Tsub is immediately set to a constant temperature. Thus, a current flowing through the second resistor is rendered constant in S108 to maintain Tsub constant. Alternatively, for example, a current value which changes temperature of the second resistor to Thsub is stored beforehand. When it is determined that Tsub>Thsub, a command may be given which causes the stored current value to flow through the second resistor or cause the temperature of the second resistor to decrease to a predetermined temperature. In either case, by adding one or the other of these controls, possible breakage of the second resistor is prevented.

Figure 16:
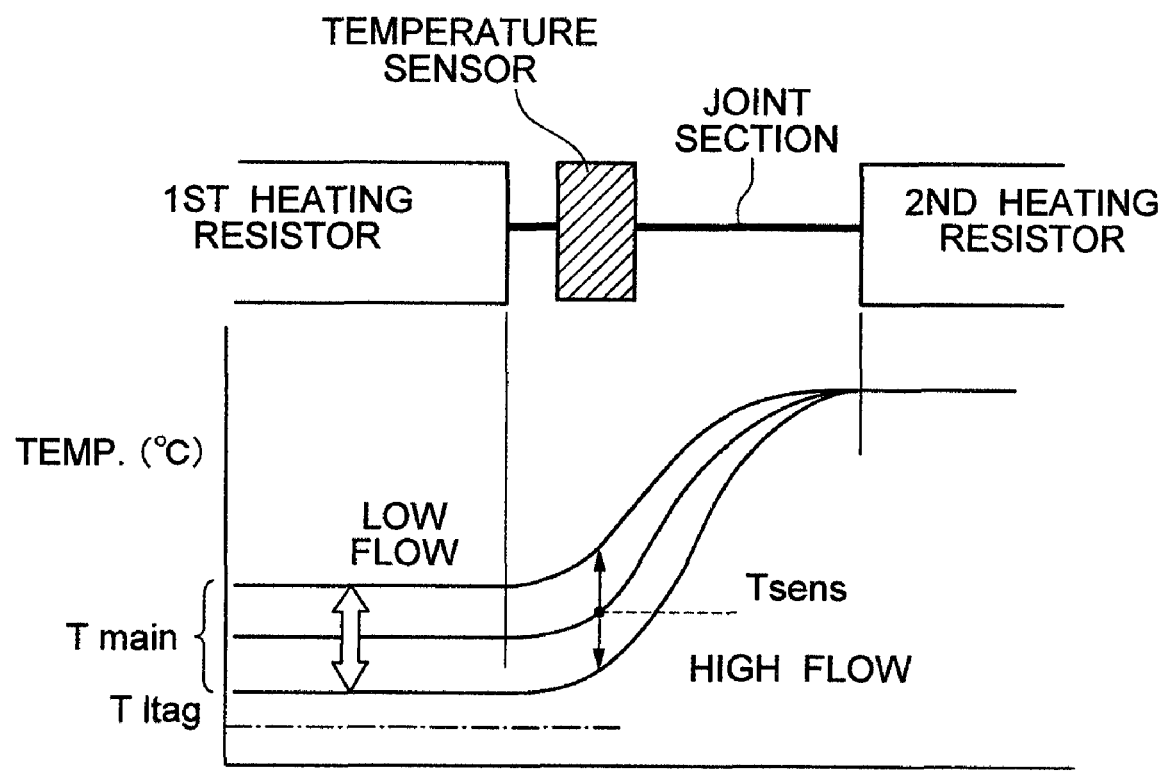
FIG. 16 illustrates the structure of a third embodiment of the present invention.

Another embodiment of the present invention is to control the temperature of the first heating resistor in accordance with a temperature sensed by a temperature sensing means, as shown in FIG. 16. Since in this case the temperature of the first flow-sensing heating resistor changes depending on the flow, a control logic is complicated. Furthermore, the temperature of the first resistor lowers excessively to a level in a high flow area where soilage occurs. In this case, it is preferable to determine the set temperature of the second resistor, using a maximum flow as a reference.

All the embodiments described above relate to the control method of maintaining a state in which the temperature gradient of the end portion of the first resistor is maintained so much as close to zero. In this case, it is not important which of the target set temperatures of the first and second resistors is higher and which of the first and second resistors should be an object of temperature control based on a sensed temperature of the end portion of the first resistor.

Figure 17:
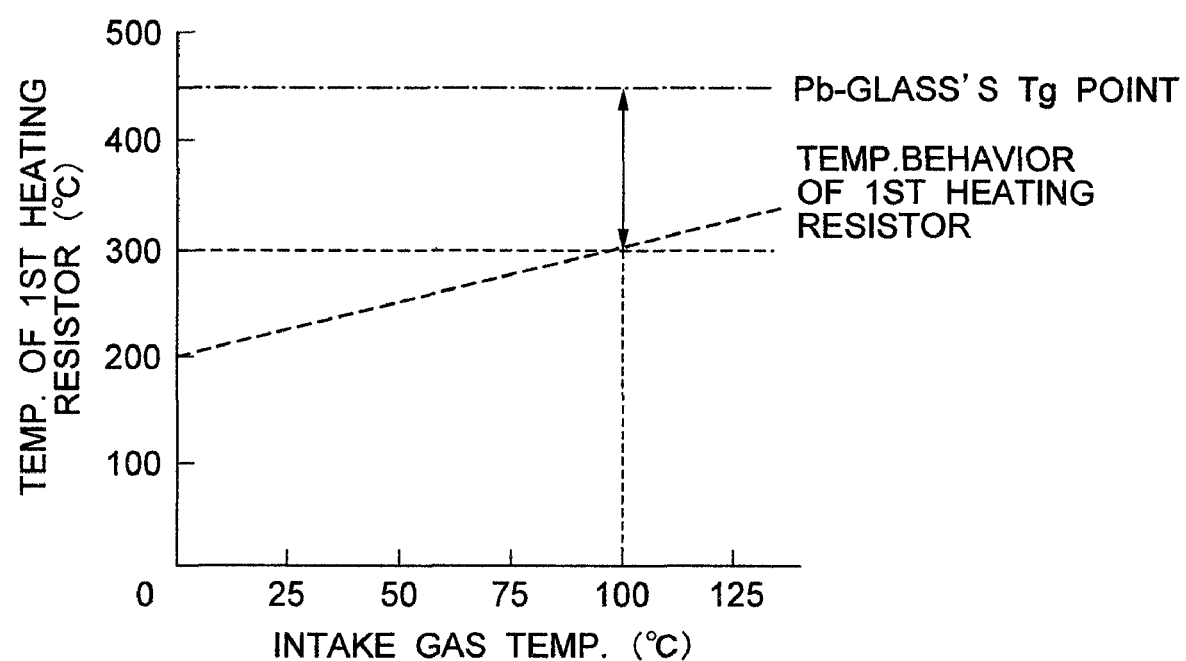
FIG. 17 illustrates a relationship between the use temperature of the heating resistor of an intake flowmeter and the heat resistance temperature of protective glass.
Figure 18:
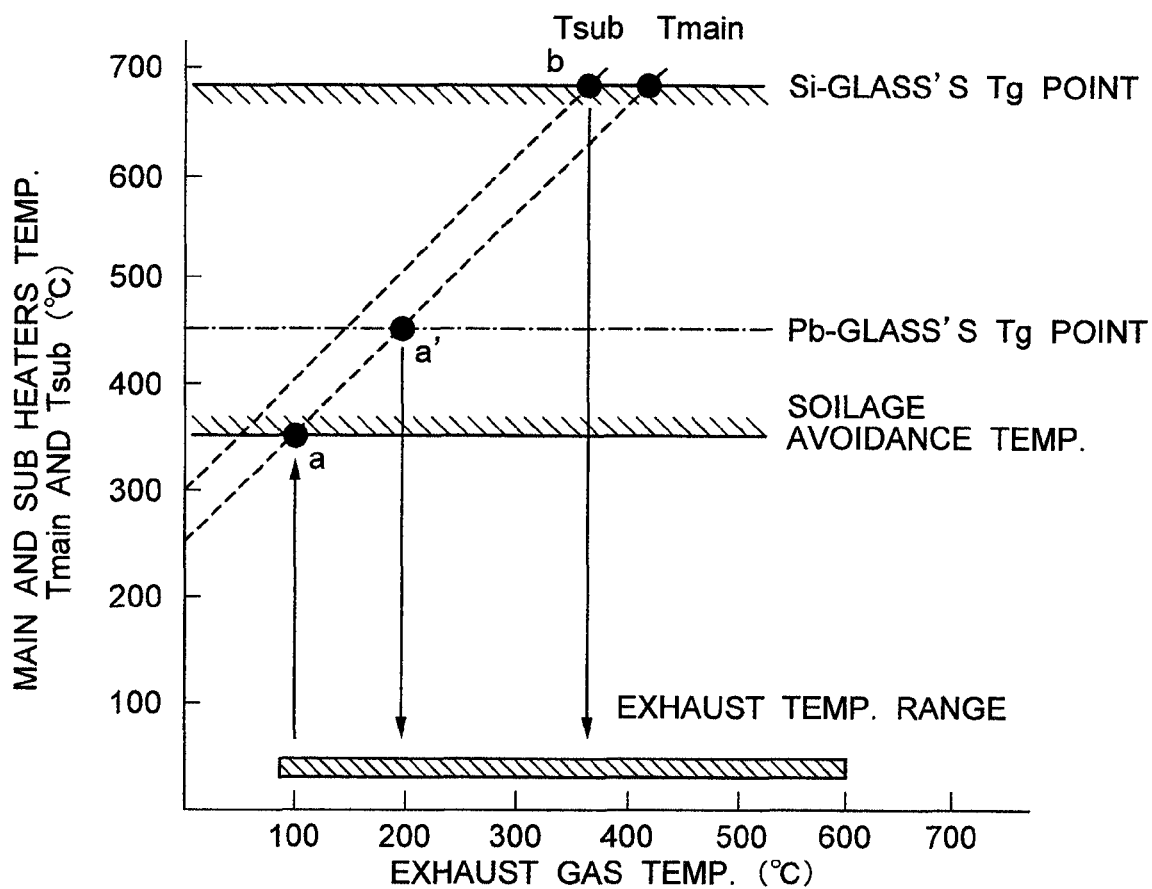
FIG. 18 illustrates a relationship between the use temperature of the heating resistor and the heat resistance temperature of the protective glass in the measurement of an exhaust gas.

Now, the heat resistance of isolating protective glass formed on the sensor element will be described. FIG. 17 shows a relationship between the heat resistance and use temperatures of the isolating protective glass formed on the sensor element of the intake flowmeter. Generally, Pb glass is used in terms of a relationship between ease of handling and heat-resistance temperature. When a difference ΔTh in temperature between the flow sensing heating resistor and the resistor that senses the temperature of the fluid is 200° C., the temperature of the heating resistor is only 300° C. at a maximum when the temperature change range of the intake air is 100° C. If the Tg point of the Pb glass at which the character of the glass starts to change is approximately 450° C., there are no special problems. However, when the inventive flowmeter is used mainly in the exhaust environment, it is required to set the temperature of the heating resistor to 350° C. at a minimum from a standpoint of soilage prevention. Especially, when the ΔTh system is assumed to be used, and even if the temperature of the first heating resistor is set to 350° C. (shown by a point "a") when the fluid temperature is 100° C. as shown in FIG. 18 and even when determination is made at the Tg point of the glass (shown by a point "a'" in FIG. 18), the fluid temperature can be guaranteed only in a range of up to approximately 200° C. When the same Pb glass is used as the protective glass for the second resistor and when the temperature of the second resistor is higher than that of the first resistor, the use of the flowmeter is limited to substantially a range of much more lower temperatures. Especially, when an exhaust gas discharged from the internal combustion engine is measured, it is required to measure the fluid having a very high temperature, for example, of 500-600° C. Silicon glass having a high heat resistance and a Tg point of approximately 700° C. cannot be used from a standpoint of thermal expansion of alumina as the insulator. Thus, even a flowmeter employing Si glass can only stand a little less than 400° C. at most from the high use temperature of the second resistor.

Figure 19:
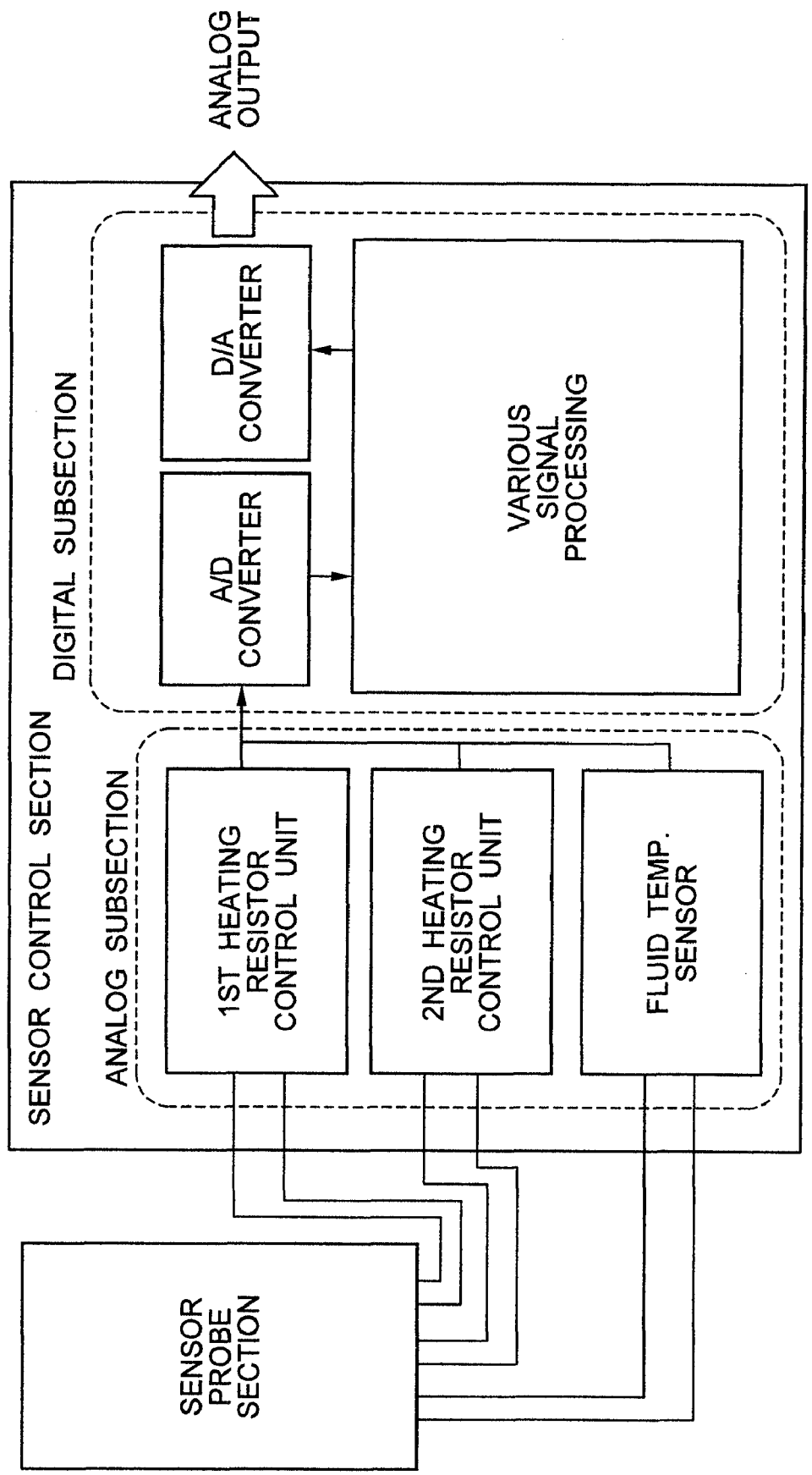
FIG. 19 schematically illustrates the structure of a sensor module in the present invention.

It can be said from this that the flowmeter according to the present invention preferably has a control system for maintaining the temperature of the heating resistor at a constant at all times irrespective of the fluid temperature (hereinafter referred to as "Th system") or a control switching system in which use is switched between the ΔTh system and the Th system at a predetermined fluid temperature; especially, the ΔTh system for a low temperature range and the Th system for a higher temperature range. Now, referring to FIG. 19, the basic structure of a sensor module to achieve these control systems will be outlined. This module mainly includes a sensor probe section including a sensor element and a sensor control section separate from the sensor probe section, which ensures heat resistance even when a high temperature gas such as the exhaust from the internal combustion engine is measured. When the temperature of the fluid of interest is low, there are no problems even when the sensor probe and the control section may be composed as a unit body. As the sensor elements, the first and second heating resistors and fluid temperature-sensing resistor are connected to the control section. In the control section, analog control units for the respective sensor elements including that for the first resistor are disposed so as to provide outputs to a digital section. The digital circuit converts an input analog signal to a digital signal which is then processed based on various other signals. Then, the digital signal is converted to an analog signal again, which is then outputted from the sensor module. In the case of the Th system, especially, a change in the temperature of the fluid is required to be corrected. In the structure of FIG. 19 shown as an example, changes in the temperature of the fluid are corrected in the digital signal processor based on a signal from the fluid temperature sensor detector, which is the basic structure of the control system.

When the first heating resistor is supported at both ends with the first heating element as a center, at least two heating resistors are required. Further, when a temperature sensing resistor is disposed at an end of the first heating resistor, the structure would be more complicated and its manufacture would be difficult.

A specified structure of the sensor element to achieve the embodiment of the present invention will be described. FIGS. 20A, 20B schematically illustrate a fluid sensor element. In this sensor element, a supporter (conductive member) supporting the respective resistors extends in one direction from the second heating resistor collectively or is arranged. More specifically, the supporters that support the first heating resistor pass through, or along the surfaces of, the temperature sensing resistor and second heating resistor and are fixed to the housing. As just described, by supporting the sensor element in a cantilevered manner, the temperature sensing resistor and the second heating resistor are collected as a unit and the productivity is improved.

Figure 21:
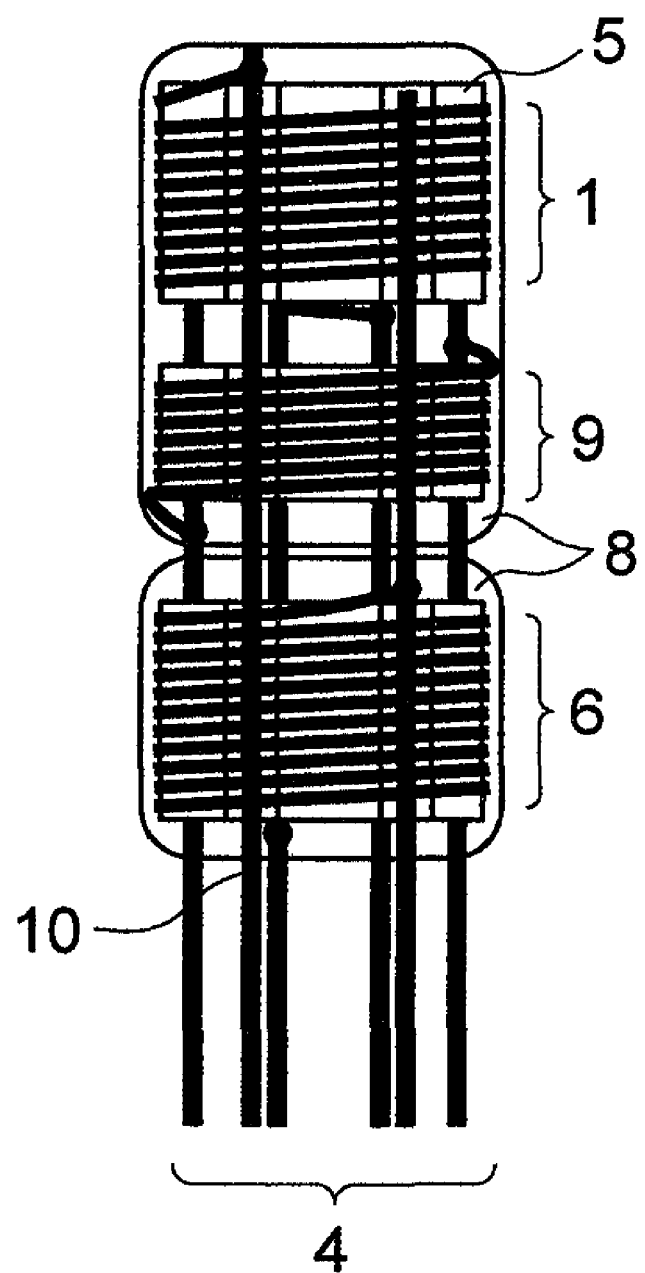
FIG. 21 illustrates a specified structure of the sensor element to achieve the embodiment.
Figure 22:
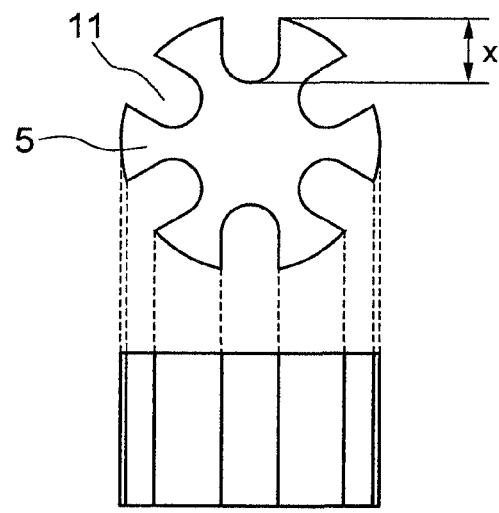
FIG. 22 illustrates the exterior of an alumina pipe used for forming the inventive sensor element.

FIG. 21 shows a sensor element of a cantilever structure that takes basically the form of a coil type element used in an intake flowmeter. In this structure, a first heating resistor 1, a temperature sensing resistor 9, and a second heating resistor 6 are disposed in this order from a tip of the sensor element. Each resistor includes a coil of turns of conductive wire wound around an alumina pipe 5 and coated with glass 8 to protect the coil in an isolating manner. A preferred shape of each alumina pipe 5 is shown as an example in FIG. 22. The alumina pipe 5 has a plurality of axial grooves 11 formed on the outer periphery thereof to receive the supporters 4. In FIG. 22, six grooves are illustrated in which each pair of grooves are used for a respective one of the resistors. The supporters 4 are inserted laterally into the respective grooves 11 and then the respective conductive wires are wound around the supporters 4, thereby forming the corresponding resistors. Thus, the depth X of the grooves is required sufficiently large compared to the outer diameter of the supporters. Each black dot in FIG. 21 shows a junction 10 between a resistor and a supporter formed by welding. From a standpoint of productivity, as to the resistor arrangement, the first heating resistor 1 and temperature sensing resistor 9 arranged close to each other are preferably molded as a unit with glass 8. However, these resistors 1 and 9 may be separated to such an extent that no soil occurs and then coated as a whole with glass.

Figure 23:
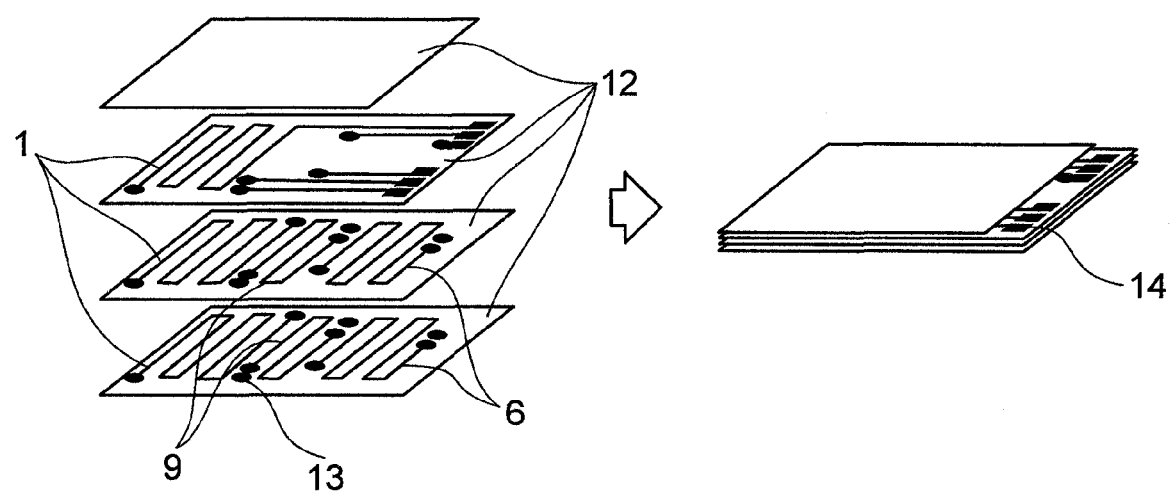
FIG. 23 illustrates another specified structure of the sensor element to achieve the embodiment.

Another technique is application of a laminate substrate technique. FIG. 23 shows the structure of a laminate-substrate type sensor element which includes a plurality of resistors (conductive members) formed between adjacent ones of laminated insulator boards 12. FIG. 23 shows an example of a sensor element of four layers. The number of layers may be increased or decreased depending on the respective resistance values of the resistors required. Resistors can be connected electrically over boards 12 by electrical conductors extending through via holes 13 formed in the respective boards. It should be noted especially that pads 14 which compose the junctions to the housing may deteriorated due to heat transmitted from the high temperature heating resistor (or second heating resistor 6). In order to avoid this situation, a sufficient distance is required between the heating resistor 6 and the pads 14.

In the inventive thermal type gas flowmeter including the plurality of resistors which in turn include the heating resistors, there is a risk that the flowmeter output will be greatly changed if some resistors are broken. In order to avoid this situation, the flowmeter should include a failure judgement means which judges a failure of the first or second heating resistor rapidly and an alarm lamp indicating the occurrence of the failure to the outside, because the thermal type flowmeter uses the fact that heat produced by the heating resistor is taken away by the fluid, or so-called heat radiation characteristic. Furthermore, if a large amount of unburnt fuel gas is discharged to the exhaust pipe due to an accidental fire in the internal combustion engine, use of the inventive flowmeter having the heating part heated to 350° C. at a minimum in the measurement may ignite, which is very dangerous. In order to avoid occurrence of this terrible situation, in the inventive flowmeter, means is provided for sensing occurrence of an accidental fire in the internal combustion engine in the sensor module or in an electronic controller which controls the whole internal combustion engine such that when the accidental fire occurs, power supply to the heating resistors is cut off or the target set temperature is changed to a lower one, thereby preventing occurrence of a secondary disaster.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:
1. A thermal type gas flowmeter comprising:
a first heating resistor arranged in an environment through which a gas to be measured flows;
an electronic circuit to which the first heating resistor is operatively connected electrically, wherein the first heating resistor is caused to generate heat by supplying power thereto to measure the flow of the gas;

a conductive member extending in one direction from the first heating resistor, one end of the conductive member being connected to a housing, for supporting the first heating resistor supported by another end of the conductive member on the housing;

a second heating resistor provided on the conductive member and between the first heating resistor and the one end of the conductive member for generating heat when supplied with power; and a temperature sensing resistor provided at a portion of the conductive member positioned between the first and second heating resistors for sensing a temperature of the portion, wherein power supply to the second heating resistor being controllable such that the temperature of the conductive member positioned between the first and second heating resistors is closer to that of the first heating resistor.

2. The thermal type gas flowmeter of claim 1, wherein:
the gas comprises an EGR gas for an engine,
power supply to the first or second heating resistor is controlled such that the temperatures of the first and second heating resistors exceed a predetermined temperature.

3. The thermal type gas flowmeter of claim 2, wherein:
the predetermine temperature is higher than 350° C.

4. The thermal type gas flowmeter of claim 1, wherein:
power supply to the first or second heating resistor is controlled such that the temperatures of the first and second heating resistors are below a predetermined temperature.

5. The thermal type gas flowmeter of claim 1, comprising a structure in a manner that a conductive wire is wound on a cylindrical insulating member a plurality of times and an insulating layer for protecting the conductive member is formed on a surface of the conductive members.

6. The thermal type gas flowmeter of claim 1, wherein the conductive member extending in one direction from the first heating resistor comprises a first conductive member connected to the first heating resistor, a second conductive member connected to the second heating resistor and a third conductive member connected to the temperature sensing resistor.

7. A thermal type gas flowmeter comprising:
a first heating resistor arranged in an environment through which a gas to be measured flows;
an electronic circuit to which the first heating resistor is operatively connected electrically,
wherein the first heating resistor is caused to generate heat by supplying power thereto to measure the flow of the gas;

a conductive member extending in one direction from the first heating resistor, one end of the conductive member being connected to a housing for supporting the first heating resistor supported by another end of the conductive member on the housing;

a second heating resistor provided on the conductive member and between the first heating resistor and the one end of the conductive member for generating heat when supplied with power; and a temperature sensing resistor provided at a portion of the conductive member positioned between the first and second heating resistors for sensing a temperature of the portion.

8. The thermal type gas flowmeter of claim 7, comprising means for controlling the temperature of the second heating resistor based on the temperature sensed by the temperature sensing resistor provided between the first and second heating resistors.

9. The thermal type gas flowmeter of claim 8, comprising means for controlling a temperature of the second heating resistor so as to bring a temperature gradient of an end of the first heating resistor closer to zero.

10. The thermal type gas flowmeter of claim 8, comprising means for controlling the temperature of the second resistor so as to be higher than that of the first heating resistor.

11. The thermal type gas flowmeter of claim 10, comprising an overheat preventing means for preventing overheat of second heating resistor, and means for controlling a heating temperature of the second heating resistor so as to keep a predetermined target upper limit temperature until the heating temperature of the second heating becomes below the predetermined target upper limit temperature, when the heating temperature of the second heating resistor has exceeded the predetermined target upper limit temperature.

12. The thermal type gas flowmeter of claim 7, further comprising means for controlling a lower one of the temperatures of the first and second heating resistors so as to be equal to or over 350° C. in the measurement or a non-measurement period.

13. The thermal type gas flowmeter of claim 7, comprising a structure in a manner that a conductive wire is wound on a cylindrical insulating member a plurality of times and an insulating layer for protecting the conductive member is formed on a surface of the conductive members.

14. The thermal type gas flowmeter of claim 7, wherein the conductive member extending in one direction from the first heating resistor comprises a first conductive member connected to the first heating resistor, a second conductive member connected to the second heating resistor and a third conductive member connected to the temperature sensing resistor.

* * * * *